United States Patent [19]

Shirokaze

[11] Patent Number: 4,958,014
[45] Date of Patent: Sep. 18, 1990

[54] MULTI-CELLULAR CELLULOSE PARTICLE AND PROCESS FOR PREPARATION THEREOF

[75] Inventor: Junichi Shirokaze, Nobeoka, Japan

[73] Assignee: Asahi Kasei Kogyo Kabushiki Kaisha, Osaka, Japan

[21] Appl. No.: 230,092

[22] Filed: Aug. 9, 1988

[30] Foreign Application Priority Data

Aug. 10, 1987 [JP] Japan .................. 62-198285

[51] Int. Cl.⁵ .............................. C08J 9/28
[52] U.S. Cl. ........................ 536/56; 536/76
[58] Field of Search .................... 536/56, 76

[56] References Cited

U.S. PATENT DOCUMENTS 3,597,350  8/1971  Determann et al. ............... 210/111
4,312,980  1/1982  Motozato et al. ................... 536/76

Primary Examiner—John Kight, III
Assistant Examiner—Carlos Azpuru
Attorney, Agent, or Firm—Armstrong, Nikaido, Marmelstein, Kubovcik & Murray

[57] ABSTRACT

A multi-cellular cellulose particle having a multiplicity of cells spaced from one another by cell membranes is described, which cells have a maximum inscribed sphere diameter of larger than 2 µm. The cells have a continuous hole structure in which the cells communicate with one another through openings in the membranes separating two adjacent cells. The multi-cellular cellulose particle is prepared by forming drops of a solution of cellulose or a cellulose derivative, cooling the drops at a temperature lower than the solidification temperature of the solution to freeze the drops, and removing the solvent by extraction or nullifying the dissolving power of the solvent.

2 Claims, 10 Drawing Sheets

100μm

100μm

10μm

10μm

100 μm

1000 μm

10μm

10μm

10μm

10μm

MULTI-CELLULAR CELLULOSE PARTICLE AND PROCESS FOR PREPARATION THEREOF

BACKGROUND OF THE INVENTION (1) Field of the Invention

The present invention relates to a multi-cellular cellulose particle having a novel structure, and a process for the preparation thereof. More particularly, the present invention relates to a multi-cellular cellulose particle having a structure suitable for use as a carrier for a catalyst, enzyme or medicine, a starting material for an ion exchange member or adsorbing material, or a microcarrier for culturing cells, and a process for the preparation of this multi-cellular cellulose particle.

(2) Description of the Related Art

Fine cellulose particles are widely utilized as packing materials for gel permeation chromatography (GPC). Moreover, since various functional groups can be easily introduced in the particles, they have a wide range of applications as ion exchange members and affinity chromatography bases. Recent developments in biochemistry and genetic engineering have caused the demand for these particles in the field of separation and purification of trace proteins in the living body to be greatly increased. Porous particles are included in present commercially available cellulose particles, and in most of these porous particles, a pore structure having a very fine pore size is produced for adjusting the exclusion limit molecular weight in GPC or adjusting the density of the particles, with the pore diameter is about 1 μm at its largest.

For example, according to the process disclosed in U.S. Pat. No. 3,597,350, cellulose is dissolved at a concentration of 1 to 12% in an aqueous cuprammonium solution or the like, the cellulose solution is dispersed in benzene containing an emulsifier, and the dispersion is thrown into a regenerating bath to obtain cellulose microspheres. It is stated that the cellulose particles obtained according to this process have a cellulose density of 2 to 25% (weight/volume) and a pore diameter ranging from 2 to 2,000 μm. In order to increase the pore diameter, the cellulose density must be reduced, resulting in a lowering of the mechanical strength of the particles. Therefore, porous particles having a pore diameter of at least 2 μm, strong enough for ordinary use, cannot be practically obtained.

According to the process disclosed in U.S. Pat. No. 4,055,510, a suspension of viscose in a water-immiscible dispersion medium is heated at a temperature of 30° to 100° C. with continuous stirring to effect solidification, and the formed particles are decomposed by an acid to obtain spherical cellulose particles. But, the particles obtained by this process are hard and gelatinous and the pore diameter is still in the order of submicrons.

A cellulose sponge is known as a cellulose structure having a large pore diameter, wherein the pore diameter is larger than several hundred μm and holes of a unit of several mm are opened.

A particulate cellulose sponge having a small pore diameter is not known. For production of a cellulose sponge, a process is usually adopted in which a large quantity of a crystal of finely divided sodium sulfate decahydrate is incorporated in viscose in advance, the viscose is cast in a mold and solidified by heating, and then the crystal of the Glauber salt is removed by water washing to form a porous structure (see, for example, Japanese Examined Pat. Publication No. 18-1580). A porous structure is usually formed according to a process in which a pore-forming material that can be removed afterward, such as Glauber salt, is incorporated in a solvent in advance. If it is intended to obtain a multi-cellular cellulose particle having a large pore diameter by combining this process with the above-mentioned process for the production of spherical particles, since a large amount of a pore-forming material having a controlled particle size is incorporated in the solution, the flowability of the solution is reduced and it is very difficult to form fine liquid drops having a uniform size.

Moreover, in the case of a particulate pore-forming material, sometimes the solubility of cellulose is reduced at the stage where the pore-forming material is incorporated, and thus a partial precipitation occurs. Furthermore, since a large excess of the pore-forming material must be incorporated in the cellulose solution, to greatly increase the void ratio in the interior of the particle or form a continuous hole structure, the mechanical strength is inevitably drastically reduced in the porous particle remaining after removal of the pore-forming material. In the cellulose sponge, a certain strength is attained by incorporating a fiber such as flax as a reinforcer into viscose in advance. According to this process, because of entanglement of the fiber in the cellulose solution, it is practically impossible to form uniform fine drops of the solution.

As is apparent from the foregoing description, it is very difficult to form particles by directly employing the process for the preparation of a cellulose sponge.

To summarize, a porous cellulose particle having many cells having a maximum inscribed sphere diameter of at least about 2 μm, in which these cells form a continuous hole structure, has not been heretofore developed.

To obtain a high-water-content shaped article of a gel of a water-soluble polymer other than cellulose (this product is also known as "a porous article", but the porosity referred to in this case is based on the concept of very fine spaces in the network of molecules of the gel and is quite different from the concept of the cells of the present invention), a solution of the polymer is cast in a mold frame or formed into a coating film, the solution is frozen, and the frozen solution is vacuum-dried without thawing. It has been proposed that a gel shaped article is obtained by utilizing the conventional technique of fixing a gel structure of the solution by the freeze-vacuum-drying method (a process using polyvinyl alcohol is disclosed in Japanese Unexamined Pat. Publication No. 57-130543 and Japanese Unexamined Pat. Publication No. 57-159826, and a process using solubilized collagen is disclosed in Japanese Unexamined Pat. Publication No. 56-23,896). But this technique has a different object and procedure than that of the present invention.

As one mode of application of the multicellular cellulose particle, there can be mentioned a mode in which the particle is packed as a carrier in a column. In this case, if pores of the particle are small, it takes a long time for a mother liquid to pass through the particle, and accordingly, to improve the reaction efficiency in the column, the liquid pressure is elevated while reducing the size of the particle. But, if this technique is adopted, the flow resistance is increased and the particle is deformed. Thus, this technique is limited. A multi-cellular particle having a large pore diameter and a small flow resistance is especially suitable as a carrier for the separation and purification of a high-molecular-weight protein derived from a living body, and thus the development of a multi-cellular cellulose particle having a large pore diameter is desired.

In a micro-carrier used for the mass culturing of adherent cells, a method has been adopted in which the cultured cell concentration is increased to $10^6$ cell/ml by sticking cells to the surface of the particle. If a multi-cellular particle has a large pore diameter such that cells can enter into the interior of the particle and can adhere thereto, by holding the cells in the interior of the particle, the problem of cells falling from the surface caused by impingement among the micro-carrier particles can be solved, and a micro-carrier can be provided in which the cultured cell concentration is further improved by a dramatic increase of the effective adhesion surface area.

Porous cellulose particles having a pore diameter smaller than 2 $\mu$m are mainly produced according to the conventional technique, cellulose particles having uniformly opened cells having a diameter of at least 2 $\mu$m cannot be obtained according to this conventional technique.

SUMMARY OF THE INVENTION

Therefore, an object of the present invention is to provide a multi-cellular cellulose particle having a large pore diameter, in which cells having a diameter of larger than 2 $\mu$m are relatively uniformly distributed.

In accordance with the present invention, there is provided a multi-cellular cellulose particle having a multiplicity of cells spaced from one another by cell membranes, which cells have a maximum inscribed sphere diameter of larger than 2 $\mu$m, wherein the cells have a continuous hole structure in which the cells communicate with one another through openings of the membranes separating two adjacent cells.

This multi-cellular cellulose particle is prepared by a process comprising forming drops of a cellulose solution, cooling the drops at a temperature lower than the solidification temperature of the solution to freeze the drops, and removing the solvent by extraction or nullifying the dissolving power of the solvent.

Furthermore, the multi-cellular cellulose particle is prepared by a process comprising forming drops of a cellulose derivative solution, cooling the drops at a temperature lower than the solidification temperature of the solution to freeze the drops, and removing the solvent by extraction or nullifying the dissolving power of the solvent, and regenerating the cellulose simultaneously or in sequence.

The gist of the present invention resides in the utilization, as the pore forming means, of a kind of a phase separation phenomenon in which, upon freezing and solidification of a cellulose solution or cellulose derivative solution, many fine crystals of the solvent or the constituent thereof (hereinafter referred to as "the solvent or the like") are formed, and the dissolved cellulose or cellulose derivative is concentrated and separated in spaces among the fine crystals of the solvent or the like. In other words, since the solvent or the like is precipitated in the form of fine crystals at the time of freezing, the cellulose in the solution is concentrated at a high concentration in small spaces among the fine particles, and by the separation of the solvent in this concentrated state, the cellulose is regenerated or precipitated in the form of a membrane. Accordingly, it is possible to obtain a novel multi-cellular cellulose particle having a maximum inscribed sphere diameter of at least about 2 $\mu$m in which the ratio of cells having a maximum inscribed sphere diameter of at least 2 $\mu$m is at least 60% by volume based on the entire cells.

The term "maximum inscribed sphere diameter" denotes a diameter of a sphere which is the largest among spheres inscribed in the cell. In the present invention, the size of cells is expressed in terms of the maximum inscribed sphere diameter.

DESCRIPTION OF THE PREFERRED EMBODIMENTS

Figure 1:
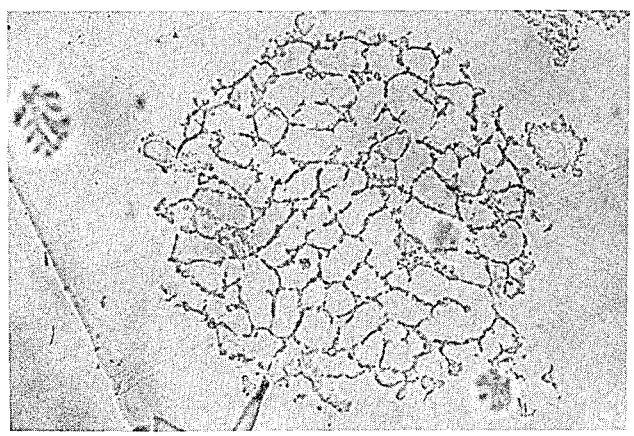
FIG. 1 is an optical microscope photograph of a section of the multi-cellular cellulose particle of the present invention obtained in Example 1, which shows cells of the particle.

According to a preferred embodiment of the present invention, there is provided a multi-cellular cellulose particle having a structure in which continuous holes of communicating cells extend radially from the surface to the interior.

In the multi-cellular cellulose particle of the present invention, the maximum inscribed sphere diameter is at least 2 $\mu$m and the cells having an inscribed sphere diameter of at least 2 $\mu$m occupy at least 60% of the total cell volume. Preferably the shortest distance between membranes is mainly at least 5 $\mu$m, especially at least 10 $\mu$m. If the shortest distance between membranes is smaller than 2 $\mu$m, a free movement of a fluid is not obtained in the multi-cellular cellulose particle and the use of the particle is restricted. The upper limit of the cell diameter is not critical but is freely selected according to the intended use and strength of the particle. In many cases, the upper limit of the cell diameter is several hundred μm, especially 200 μm.

The thickness and structure of the cell membranes are not particularly critical, so long as openings for connecting cells to one another are formed in the respective membranes. Preferably, the size of the openings is not too small compared with the maximum inscribed sphere diameter of the cells. Namely, preferably the size of the openings is at least about 1/30 of the maximum inscribed sphere diameter of the cells. If the size of the openings is too large, the strength of the particle structure becomes too low and breakage often occurs during use. Therefore, preferably the size of the openings is smaller than about ¾, especially ⅔, of the maximum inscribed sphere diameter of the cells.

Finer holes are sometimes observed in the membranes in addition to the above-mentioned openings having a relatively large size. The presence of such finer holes is preferred so long as the attainment of the object of the present invention is not hindered thereby.

The multi-cellular particle of the present invention, that is, the membrane constituting the particle, is composed substantially of a cellulose. The starting material of the cellulose may be any of pulp, linter, waste paper, bacterium-produced cellulose and regenerated cellulose, and the starting material is not particularly critical.

The cellulose constituting the particle is obtained by dissolving the starting material described above by the method described hereinafter and reprecipitating or regenerating the cellulose, and the average degree of polymerization is not particularly critical. In general, preferably the average degree of polymerization is about 100 to about 1,000, but a cellulose having a higher polymerization degree, such as a bacterium-produced cellulose (i.e., cellulose produced by utilizing a bacterium) is more preferable, so long as the attainment of the intended object of the present invention is not hindered thereby.

The presence of a small amount of hemicellulose or hydrolyzed or oxidized cellulose in the cellulose constituting the particle is permissible, so long as the attainment of the object of the present invention is not hindered thereby.

The shape or size of the particle of the present invention is not particularly critical, and is usually selected from among a spherical shape, an oblong spheroid shape, and a flat spheroid shape. In special cases, a columnar shape, a cylindrical shape or a saddle-like shape is permissible for increasing the packing effect. The size is optionally selected according to the intended use. The diameter (the diameter in the case of a spherical particle or the diameter of the inscribed sphere in the case of a particle having another shape) is usually 5 to 500 μm, but in an extreme case, the diameter may be 5 mm or larger. It will be readily understood that the particle can have a fibrous or filmy form.

In the process of the present invention, since a pore-forming material or other foreign material need not be incorporated into the cellulose solution or cellulose derivative solution, fine uniform liquid drops can be easily formed, and the particle size can be optionally controlled. The maximum inscribed sphere diameter and shape of the cells are generally determined according to the size and shape of crystals formed when the solvent or the like in the solution is frozen and solidified. Accordingly, the shape and maximum inscribed sphere diameter can be adjusted by changing the kind of the cellulose solution or cellulose derivative solution, and the freeze-solidifying conditions such as the temperature.

As the cellulose solution that can be used in the present invention, there can be mentioned, for example, solutions formed by dissolving cellulose in aqueous solutions of metal complexes such as cuprammonium, cupri-ethylenediamine (CED), Cadoxen, iron sodium tartrate (EWNN), nickel-ethylenediamine (Nioxen), nickel-ammonia (Nioxam), cobalt-ethylenediamine (Cooxen), and zinc-ethylenediamine (Zincoxen), solutions formed by dissolving cellulose in dimethylacetamide/lithium chloride type solvents, solutions formed by dissolving cellulose in amines such as N-methylmorpholine oxide, triethylamine oxide, and cyclohexyldimethylamine, solutions formed by dissolving cellulose in combined solvents of ammonia and a salt such as ammonium thiocyanate, sodium iodide, sodium nitrate, sodium thiocyanate or ammonia iodide, and solutions formed by dissolving cellulose in aqueous solutions of alkalis such as caustic soda, sodium hydroxide, potassium hydroxide, and cesium hydroxide, as disclosed in Japanese Unexamined Pat. Publication No. 60-42438. Of course, the solutions that can be used in the present invention are not limited to those exemplified above.

As the cellulose derivative solutions that can be used in the present invention, there can be mentioned, for example, a solution formed by reacting cellulose with paraformaldehyde in dimethylsulfoxide to obtain partially methylolated cellulose in solution form, a solution formed by reacting cellulose with dinitrogen tetroxide in dimethylformamide to obtain cellulose nitride ester in solution form, a solution formed by reacting cellulose with an amine and sulfur dioxide in dimethylsulfoxide (DMSO) to obtain the resulting modified cellulose in solution form, a cellulose-sodium xanthogenate solution, and a solution of cellulose acetate in acetone. The solutions that can be used in the present invention are not limited to those exemplified above.

The shape and size of the multi-cellular cellulose particle can be controlled by the kind of cellulose solution or cellulose derivative solution, the cellulose concentration, and the viscosity of the solution, and moreover, the shape and particle size can be controlled according to the method of forming drops of the solution. As the method of forming drops of the solution, there can be mentioned a spray nozzle method in which the solution is atomized in a gaseous atmosphere, a method in which the solution is extruded in a fluid, and an emulsion dispersing method, although the methods that can be used are not limited to these methods.

Note, there can also be mentioned a method in which the solution is extruded from a nozzle or die as in the usual spinning or film-forming method and the resulting fiber or film is cut and divided to the particulate form at an appropriate subsequent step.

Freezing is accomplished by introducing the drops into a medium adjusted to an optional temperature. In a liquid or gas unreactive and immiscible with the cellulose solution or cellulose derivative solution, the drops are frozen in the form of true spheres. In a liquid miscible with the solution, the drops are frozen in an irregular shape, and in a liquid or gas reactive with the solution, the drops can be frozen in a state where only the surface portion is modified. For example, if the drops are frozen in a liquid or gas miscible with the cellulose solution or cellulose derivative solution, where the liquid or gas permeates only the surface portion of the particle before the temperature is lowered to the freezing temperature, the cellulose is precipitated in the form of a film covering the surface, with the result that a particle having many cells is obtained, in which only the surface layer is covered with a film and the cells are not opened or only partially opened to the surface.

When freezing is performed in the process of the present invention, the freezing temperature is not particularly critical, so long as the freezing temperature is lower than the temperature at which the solvent or the like is frozen. Nevertheless, the freezing temperature is important for the growth of crystals of the solvent or the like and in determining the size of cells in the particles of the present invention, and therefore, the freezing temperature is appropriately selected according to the kind of the solvent or the like and the intended cell size. If too low a freezing temperature is selected by using liquefied nitrogen or the like, crystals are not formed at the time of freezing. The cellulose solution is frozen while the solution structure is substantially maintained, and a gel structure similar to the gel structure obtained in the ordinary wet coagulation method is formed, and good results can not be obtained. Note, if the freezing temperature is adjusted to a level lower by 30° to 40° C. than the freezing temperature of the solvent or the like, a particle can be obtained in which only the surface portion has a gel structure and the interior has a multi-cellular structure, and the surface is partially covered with a gel film while leaving some openings communicating with the interior of the particle. A multi-cellular particle having such a structure has an especially high resistance to deformation under compression. In general, freezing is not carried out at a temperature lower by more than 40° C. than the freezing temperature of the solvent or the like, and to increase the maximum inscribed sphere diameter, freezing is usually carried out at a temperature lower by 0° to 20° C. than the freezing temperature of the solvent or the like.

In the process of the present invention, the frozen cellulose solution or cellulose derivative solution is subjected to removal of the solvent by extraction or reduction of the dissolving power of the solvent (inclusively called "solvent removal or the like" hereinafter) to obtain a solidified multi-cellular cellulose particle. In short, the coagulation method customarily used in wet forming of a cellulose solution or cellulose derivative solution, such as dilution precipitation, sedimentation, solvent extraction or acid or alkali neutralization can be directly adopted. Furthermore, since a salt solution such as a solution comprising 10% of $Na_2SO_4$, 50% of ethylene glycol and 40% of $H_2O$ is not frozen even at −20° C., a phenomenon can be utilized in which water converted to ice in frozen drops of a certain cellulose solution is gradually replaced by the salt solution to reduce the dissolving power of the solvent.

The conditions of the solvent removal are not particularly critical, and it is sufficient if the frozen particle is quickly thrown into an optional coagulation bath or regeneration bath. Preferably, the coagulation bath or regeneration bath is maintained at a temperature lower than the freezing temperature of the solvent or the like.

Note, where a cellulose derivative is used, the regenerating step is indispensable, and this regeneration is performed simultaneously with the solvent removal or in sequence (that is, after the solvent removal). The regeneration can be carried out according to customary procedures.

The multi-cellular particle which has been subjected to the solvent removal or to the solvent removal and the regeneration is then washed with water or other detergent, and if necessary, the particle is subjected to drying, steam sterilization or the like before the particle is used. The washing and drying conditions are not particularly critical, and appropriate conditions can be optionally selected according to the intended use.

Since the multi-cellular cellulose particle of the present invention has continuous cells having a diameter of at least about 2 $\mu$m, the particle has a structure allowing an easy egress and ingress of a liquid or solid. The partition wall defining cells of the multi-cellular particle is, in principle, composed of cellulose which is a natural substance, and therefore, the particle has a good affinity for water, is biologically harmless, and is advantageous in that the organic solvent resistance and heat resistance are good. By dint of these merits, the particle is valuable for use as a filler in affinity chromatography, a carrier for a stabilized enzyme, or a micro-carrier for culturing cells directly or after partial chemical modification.

When the particle is used as a carrier in chromatography, a good liquid passing property is obtained even for a viscous liquid. Moreover, since even cells having a large volume, such as animal cells, can enter into the interior from holes opened to the surface, the particle can be used as a micro-carrier holding cells in the interior of the particle, which is different from the conventional micro-carrier of the surface adhesion type. Moreover, the particle can be easily converted to a derivative by utilizing the reactive hydroxyl groups of the cellulose, and an enzyme-fixing property, an ion-exchange capacity or a chelating capacity can be imparted. Therefore, the particle can be applied to various uses.

The process of the present invention is characterized in that since the solvent or the like is precipitated in the form of fine crystals in the freezing step, the cellulose in the solution is concentrated at a high concentration in small spaces among the fine crystals. Since the cellulose is precipitated or regenerated in the filmy form by separation of the solvent in this concentrated state, a tough film structure can be obtained, and even if a reinforcer is not incorporated, a multi-cellular particle having a mechanical strength high enough to resist industrial applications can be obtained. Furthermore, since a foreign substance is not incorporated as a pore-forming material, the purity of the product is very high.

The present invention will now be described with reference to the following examples. In the examples, the viscosity of the cellulose solution or cellulose derivative solution is measured by a commercially available rotary viscometer at a temperature of 23° C. while rotating the rotor at 20 rpm.

The cuprammonium relative viscosity ($\zeta_{rel}$) of cellulose is measured according to the method of JIS P-8101, and the average degree of polymerization (DP) was determined from the cuprammonium viscosity according to the following formula [I.E.C., 42, 502 (1950)]:

$$DP = 520\ (\zeta_{rel} - 1)\ \text{(when DP} < 300\text{), or}$$

$$DP = 2160\ [\log(\zeta_{rel} + 1) - 0.267]\ \text{(when } DP \geqq 300\text{)}$$

The diameter of the particle was measured in the undried state by an optical microscope at appropriate magnifications. In the case of a fine particle having a diameter smaller than 50 μm, a measurement method was also adopted in which a washed but undried particle was rapidly cooled by liquefied nitrogen and then freeze-dried under vacuum of −0.1 Torr (freeze-drying treatment) and the particle observed by a scanning electron microscope (SEM). The open hole diameter and opening area ratio of the surface of the particle were determined by subjecting the freeze-dried sample to a gold spattering treatment and observing the surface by SEM at appropriate magnifications. The maximum inscribed sphere diameter was determined by performing the freezing treatment by liquefied nitrogen in the same manner as above described, splitting the sample at the same temperature, carrying out the drying treatment under vacuum and subsequent treatments and observing the section of the particle by SEM. Note, where the particle or cell was not truly spherical, the shortest diameter was defined as the diameter of the particle or cell.

EXAMPLE 1

Figure 3:
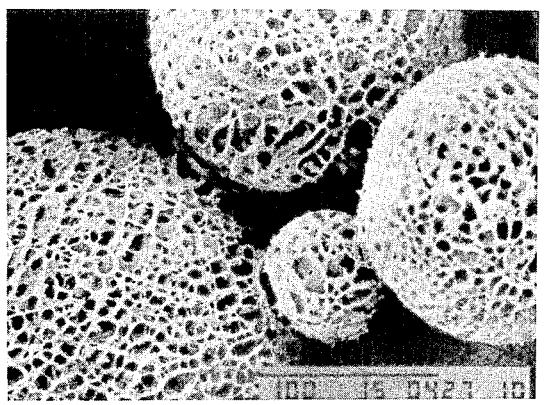
FIGS. 3 through 6 are scanning electron microscope (SEM) photographs showing the structure of the multi-cellular cellulose particle of the present invention obtained in Example 1.
Figure 2:
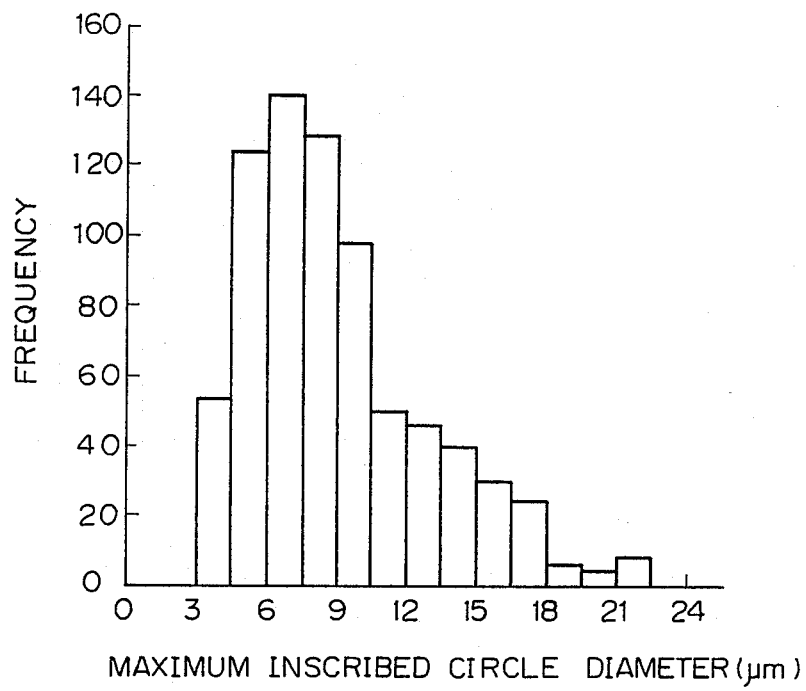
FIG. 2 is a frequency distribution diagram of maximum inscribed sphere diameters of the cells in the multi-cellular cellulose particle of the present invention obtained in Example 1.
Figure 4:
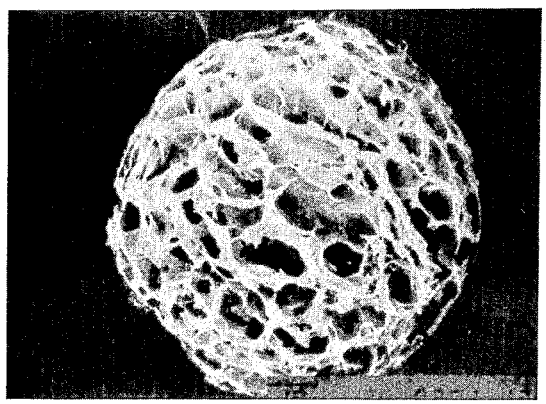
Figure 5:
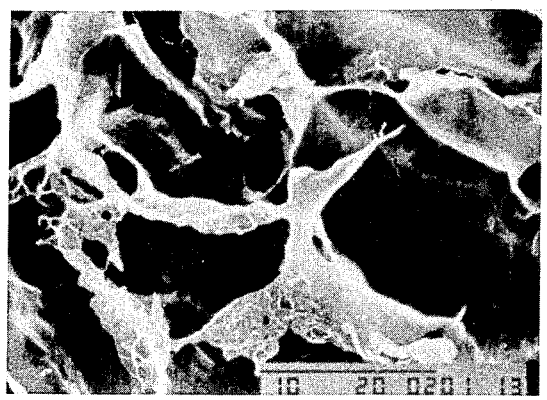

Dissolving Sulfite Pulp AL-T (conifer pulp prepared by the sulfurous acid process) supplied by Alaska Pulp Co. was acid-hydrolyzed so that the average degree of polymerization was 450, and the hydrolyzed pulp was dissolved in an 8% aqueous solution of sodium hydroxide at −6° C. to form a cellulose solution having a concentration of 3%. The solution was sprayed in the form of an atomized fine particle into hexane at −16° C. by using a spray nozzle to obtain a frozen solution having a fine particulate form in hexane. After 30 minutes, the frozen body of the solution was taken out from the hexane containing vessel and thrown into a 50% aqueous solution of sulfuric acid at −20° C. This state was maintained for 5 hours at −20° C., and the formed particles were washed with water. When about 50 particles were observed by an optical microscope, it was found that the particle diameter was 50 to 300 μm. Then, 6 particles were randomly selected from these particles and subjected to substitution washing with a 50% aqueous solution of a water-soluble methacrylic resin type embedding liquid, Quetol 523M supplied by Nisshin-EM Co., and substitution was repeated two times with a 100% solution of Quetol. Final substitution was carried out with a liquid formed by adding 0.05 g of a polymerization initiator, QCU-1, to 100 ml of Quetol, and embedding curing was carried out under predetermined curing conditions (60° C. and 12 hours). After the curing, the embedded sample was dry-cut along the center line of the particles by a glass knife to obtain a cut piece having a thickness of 1 μm, and the cut piece was observed using an optical microscope. It was found that, in all the particles, cells were uniformly distributed (see FIG. 1). When all of the maximum inscribed circle diameters were measured from photographs of the cut pieces of the six particles and the frequency distribution was determined (see FIG. 2), it was found that the maximum inscribed circle diameters were distributed in the range of from 3 to 22 μm. The thus-measured values of the maximum inscribed circle diameters are considered to be approximately the same as the maximum inscribed sphere diameters as herein before defined in the this specification. The observation by SEM indicated that each particle was a spherical particle composed of an aggregate of the above-mentioned cells (see FIG. 3). The observation at high magnifications revealed that there was formed a continuous structure in which membranes spacing the cells from one another were partially opened (see FIGS. 4 and 5).

Figure 6:
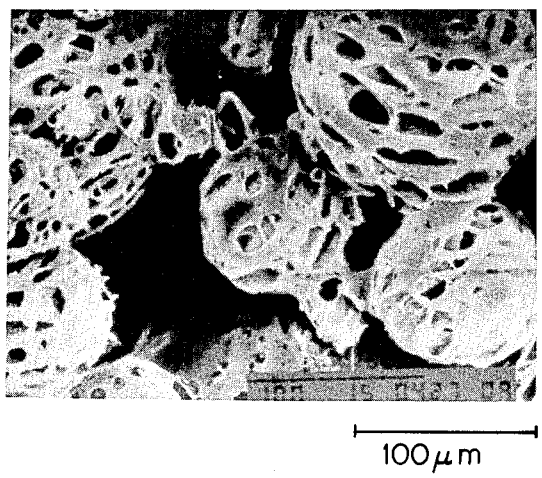

Then, particles were prepared in the same manner as described above except that the temperature of the hexane was changed to −20° C., and the particles were similarly observed by SEM. It was confirmed that the particles were partially covered with a film, as shown in FIG. 6.

EXAMPLE 2

Particles having a diameter of about 50 to about 300 μm were prepared in the same manner as described in Example 1 except that 2% by weight of ethanol was added to the hexane used in Example 1 and the temperature was changed to −15° C. After neutralization and water washing, the particles were frozen and split at the temperature of liquefied nitrogen, and observation was carried out by SEM in the same manner as described in Example 1. It was found that the particles had a double structure in which the surface was covered with a film and the interior had open cells having a maximum inscribed sphere diameter of 10 to 20 μm.

EXAMPLE 3

Figure 7:
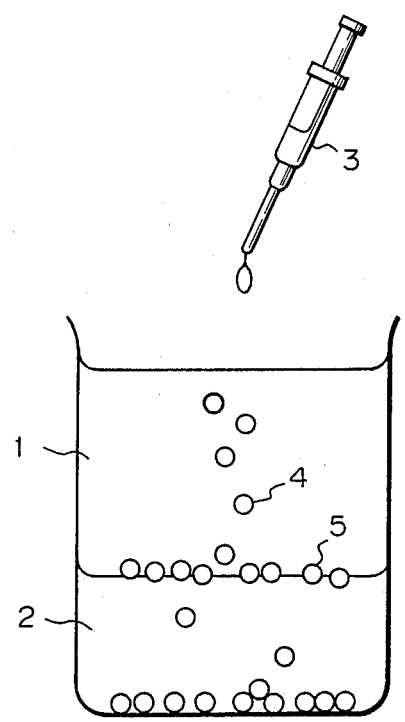
FIG. 7 is a diagram illustrating an embodiment of the process of the present invention.

A silicone oil (KF96 supplied by Sinetsu Silicone Co.) and 50% sulfuric acid were charged in a 3-liter beaker as shown in FIG. 7, and the charge was cooled to −16° C. (reference numerals 1 and 2 in FIG. 7 indicate the silicone oil and the 50% sulfuric acid, respectively). A cellulose solution having a cellulose concentration of 6%, which was prepared from the same starting material as used in Example 1, was dropped to the charge by using a syringe 3. While drops 4 of the cellulose solution slowly fell in the silicone oil, the drops were rendered spherical and frozen to white drops. The frozen drops 5 stayed for a while in the boundary between the silicone oil and sulfuric acid, and then the frozen drops began to fall again and arrived at the bottom of the beaker.

When the drops which had arrived at the bottom of the beaker were washed with hexane and water, cellulose particles having a diameter of about 5 mm were obtained. The obtained white spherical particles had a sponge function such that when a pressure was applied to the particles by depressing the particles with a finger, the particles were deformed and water contained in the interior was discharged. When the pressure was removed, the original shape was immediately restored. It was found that the particles had a tough structure which was difficult to destroy by deformation caused by an application of an external force.

Figure 8:
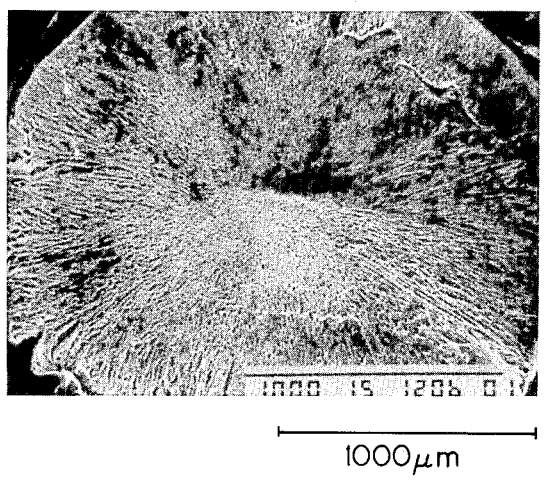
FIGS. 8 and 9 are SEM photographs showing an example of the multi-cellular cellulose particle of the present invention in which cells are opened in a directional manner.
Figure 9:
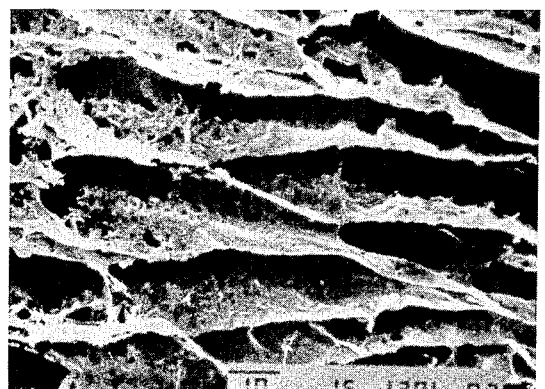

When the particles were freeze-split and freeze-dried and the sections were observed, it was found that crystals of water grew from the surface toward the center and all the cells were opened to the center of the particle (see FIG. 8). FIG. 9 is an enlarged SEM photograph of the section, from which it is seen that the cells were opened in a directional manner. In FIG. 9, the center of the particle is located on the right side.

Furthermore, it is seen that in the particle obtained in the present example, the membrane between cells had a fine multi-cellular structure as shown in FIG. 9.

EXAMPLE 4

Figure 10:
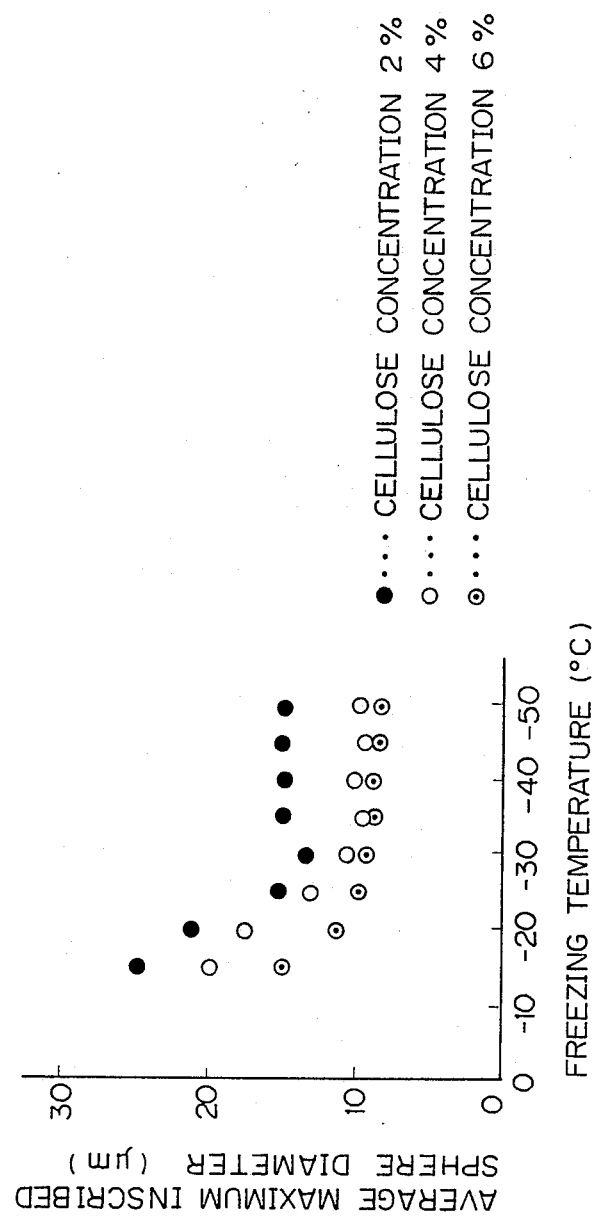
FIG. 10 is graphs showing the influences of the solution-freezing temperature and the cellulose concentration on the average maximum inscribed sphere diameter in the section of the multi-cellular cellulose particles.

Three cellulose solutions having cellulose concentrations of 2%, 4% and 6% by weight, respectively, were prepared according to the method described in Example 1, and influences of the cellulose concentration and the freezing temperature condition on the cell size were examined. A 3-liter beaker charged with 50% sulfuric acid and hexane was used as the freezing tank, and the liquid temperature was controlled in the range of from −15° C. to −50° C. at intervals of 5° C. The cellulose solution was sprayed from a spray nozzle located 5 cm above the liquid level by using nitrogen gas, and fine cellulose particles were taken out from the bottom portion of the beaker. The particles were washed with water, and only particles having a diameter of 100 to 150 μm were collected by using 110-mesh and 145-mesh sieves. The maximum inscribed sphere diameters of cells on the particle surface and cells in the section were measured by SEM. It was found that the maximum inscribed sphere diameter of the cells gradually decreased as the cellulose concentration was elevated. It also was found that the maximum inscribed sphere diameter depended greatly on the freezing temperature and largest cells were formed at −15° C. The cell size was reduced with lowering of the freezing temperature, but the size of cells located in the central portion of the particle seen from the section had a constant value of 8 to 15 μm, differing according to the concentration of the solution, at temperatures lower than −25° C. (see FIG. 10).

Figure 11:
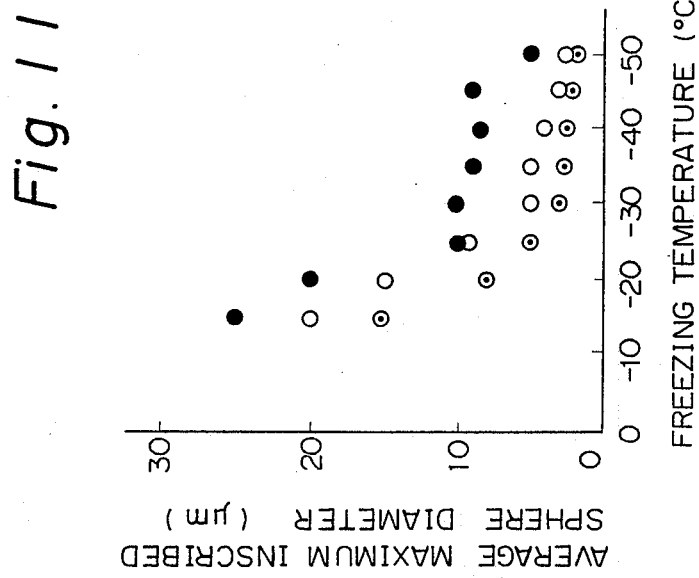
FIG. 11 is graphs showing the influences of the solution-freezing temperature and the cellulose concentration on the average maximum inscribed sphere diameter in the surface portion of the multi-cellular cellulose particles.
Figure 12:
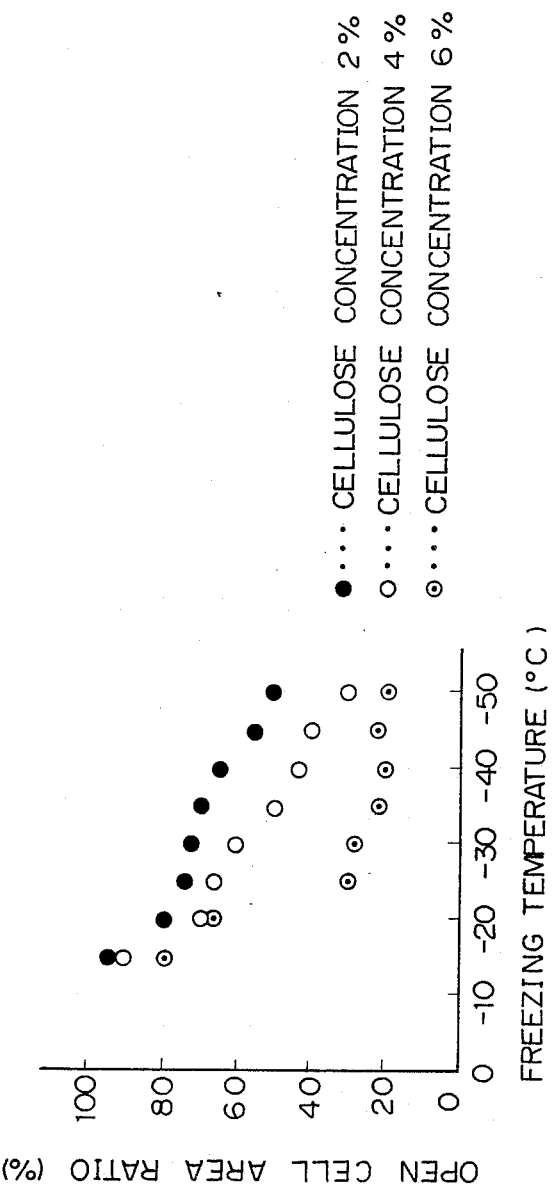
FIG. 12 is graphs showing the influences of the solution-freezing temperature and the cellulose concentration on the open cell surface area of the multi-cellular cellulose particles.

In the surface portion, the cell size was reduced with lowering of the freezing temperature (see FIG. 11) and also the open cell surface area of the surface was reduced and the structure was gradually changed to a film-covered structure (FIG. 12). Accordingly, a sponge-like particle having the surface covered with a film could be obtained only by setting the freezing temperature at a low level.

EXAMPLE 5

Viscose having a viscosity of 2,530 cps at 23° C., a cellulose concentration of 7.4%, an NaOH concentration of 5% and a γ value of 36, which was prepared by using a conifer pulp prepared by the sulfurous acid process as the starting material, was dropped into a 3-liter beaker charged with a silicone oil and 50% sulfuric acid cooled to −16° C. by a syringe in the same manner as described in Example 3. When the liquid drops were frozen, the drops became opaque to have a creamy color. The frozen drops stayed for a while in the boundary between the silicone oil and sulfuric acid and generated bubbles, and then the drops began to fall and arrived at the bottom of the beaker.

Figure 13:
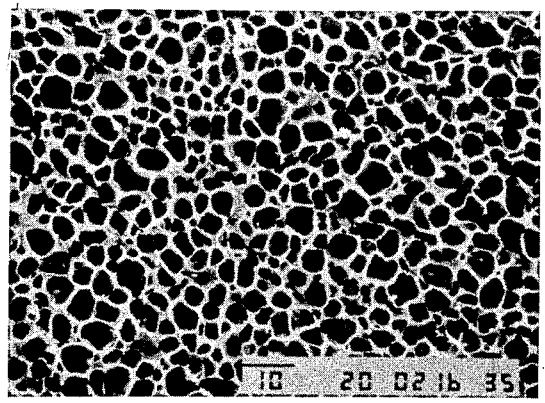
FIG. 13 is an SEM photograph of the multi-cellular cellulose particle of the present invention obtained in Example 5.

The particles which had arrived at the bottom of the beaker were washed with water at normal temperature, and then the particles were freeze-split and freeze-dried according to the above-mentioned method and were observed by SEM. It was found that, in the surface portion of the particle having a diameter of about 5 mm, cells having a maximum inscribed sphere diameter of 2 to 8 μm were opened (see FIG. 13) and in the interior, cells having a maximum inscribed sphere diameter of 10 to 15 μm were opened.

EXAMPLE 6

A cellulose cuprammonium solution having a viscosity of 10,000 cps at 23° C., a cellulose concentration of 6%, a copper concentration of 3.6% and an ammonia concentration of 7.0%, which was prepared from refined linter as the starting material, was dropped into a 3-liter beaker charged with a silicone oil and 50% sulfuric acid cooled to −19° C. by a syringe in the same manner as described in Example 3. When the liquid drops were frozen, the drops became opaque to have an azure color. The frozen drops stayed for a while in the boundary between the silicone oil and sulfuric acid, and then the drops began to fall again and arrived at the bottom of the beaker.

The particles which had arrived at the bottom of the beaker were washed with water at normal temperature and freeze-split and freeze-dried according to the above-mentioned method to obtain spherical particles having a diameter of about 8 mm. When the particles were observed by SEM, it was found that a considerable portion of the surface was covered with a film, the ratio of the area occupied by open pores was 30% and the maximum inscribed sphere diameter was 10 to 20 μm. In the interior of the particle, the maximum inscribed sphere diameter of cells was 20 to 60 μm.

EXAMPLE 7

This example illustrates an application of the multi-cellular particle of the present invention.

A sterilized solution of collagen I, Cellmatrix I-A (supplied by Nitta Gelatin K.K.), was diluted 5 times with a sterilized aqueous solution of hydrochloric acid having a pH value of 3 to prepare 10 ml of a solution of collagen I having a concentration of 0.6 mg/ml, and the solution was maintained at 4° C.

Among particles prepared at a cellulose concentration of 4% and a freezing temperature of −15° C. in the same manner as described in Example 4, only particles having a diameter of 840 to 1,000 μm were collected by using 46-mesh and 20-mesh sieves. The particles in the undried state were sampled in an amount of 0.1 g as calculated as the dry weight of the cellulose and subjected to an autoclave sterilization treatment at 130° C. for 2 hours together with 100 ml of distilled water in a pressure-resistant glass bottle, and the particles were maintained at 4° C. Then, 10 ml of the above-mentioned solution of collagen I was added and the mixture was stirred under ice cooling. The liquid temperature was elevated to 25° C. over a period of 1 hour with stirring and the mixture was washed with sterilized water. Separately, 5 ml of Ham F-12 medium (supplied by Dainippon Seiyaku K.K.) to which 5% of bovine fetal serum (supplied by Dainippon Seiyaku K.K.) was added was charged in a dish having a diameter of 60 mm. The water-washed particles were added to the medium so that the particles were packed in one layer on the bottom surface of the dish. Then, cells of strain CHO-K1 (supplied by Dainippon Seiyaku K.K.) derived from the Chinese hamster ovary were added, and incubation was carried out at 37° C. for 7 days in 5% of carbon dioxide. Then, the particles were placed in 2% glutaraldehyde and allowed to stand at 4° C. for 3 hours, and the particles were washed two times with a phosphate buffer solution (PBS) and treated at 4° C. for 1.5 hours with 2% osmic acid.

Figure 14:
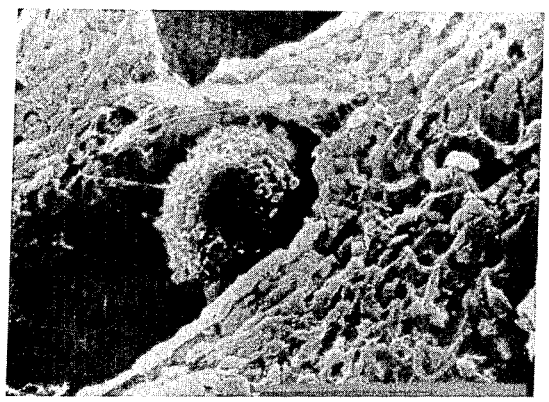
FIGS. 14 and 15 are SEM photographs showing an application example where the multi-cellular cellulose particle of the present invention was treated with collagen and the cells were allowed to adhere and grow in the multi-cellular structure of the particle.
Figure 15:
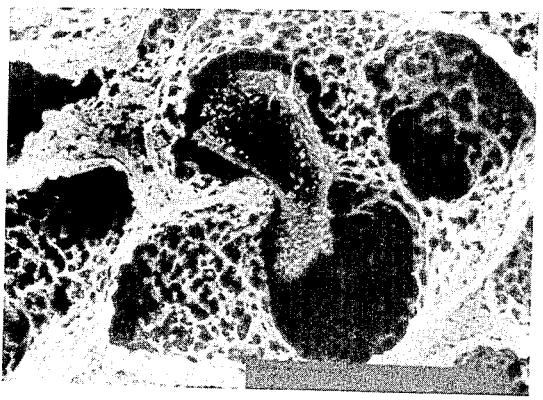

Then, the particles were treated with a 20% aqueous solution at 4° C. for 10 minutes a 50% aqueous solution of ethanol at 4° C. for 10 minutes, and a 70% aqueous solution of ethanol at 4° C. for 10 minutes, and alcohol substitution was then carried out with 80% ethanol, 90% ethanol, and 100% ethanol at room temperature. Then, the particles were immersed in isoamyl acetate for 30 minutes and subjected to critical point drying treatment using carbon dioxide to obtain a dry sample. When the sample was subjected to the gold vacuum deposition treatment and observed by SEM, it was confirmed that CHO-K1 adhered and grew in cells of the particles (see FIGS. 14 and 15).

EXAMPLE 8

Among particles having about 60% of their surface covered with a film, which were prepared from a cellulose solution having a polymerization degree of 400 and a cellulose concentration of 4% by freezing at −40° C. in the same manner as described in Example 4, only particles having a diameter of 100 to 150 μm were collected, and the particles were packed in a glass column having an inner diameter of 2 cm to a height of 2 m and distilled water was passed at a rate of 100 ml/min at a temperature of 23° C. for 30 minutes. The particles in the bottom portion were recovered and observed by an optical microscope and SEM according to the procedures described hereinbefore. It was confirmed that the particles retained a spherical shape, and rupture or breakage was not observed.

I claim:

1. A multi-cellular cellulose particle comprising cells separated from one another by cell partitions in the form of membranes, wherein the cells are in continuous communication with one another through openings in the partitions, and wherein least 60% by volume of the cells consist of cells having such dimensions that the largest sphere which can be fitted into each cell has a diameter of more than 2 μm.

2. A multi-cellular cellulose particle as set forth in claim 1, wherein the continuous holes of the communicating cells extend radially from the surface to the interior.

* * * * *